(No Model.)
T. H. DEARDORFF & A. U. BETTS.
PNEUMATIC SEAT FOR BICYCLES.
No. 467,352. Patented Jan. 19, 1892.
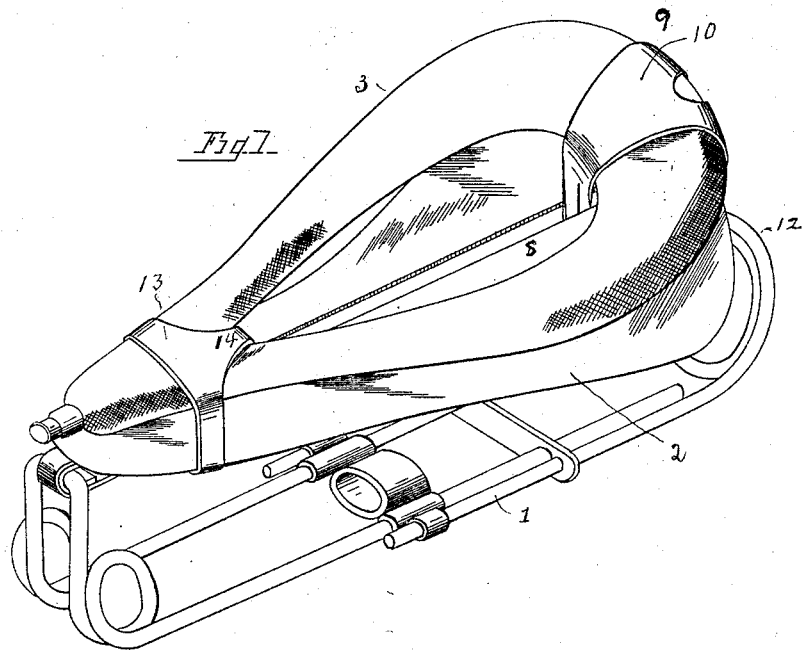
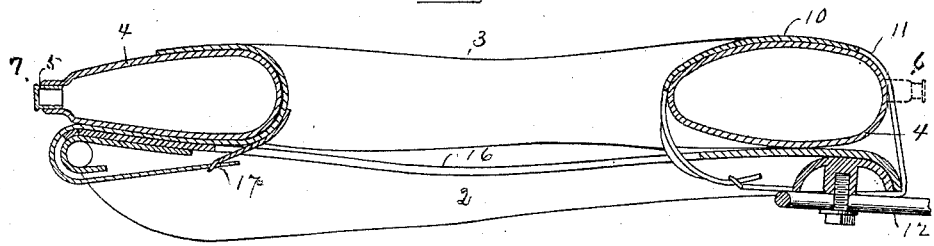
WITNESSES
Carroll J. Webster
Floyd R. Webster
INVENTORS
T. H. Deardorff
A. U. Betts
By William Webster
atty

UNITED STATES PATENT OFFICE.

THEODORE H. DEARDORFF AND ARLINGTON U. BETTS, OF TOLEDO, OHIO.

PNEUMATIC SEAT FOR BICYCLES.

SPECIFICATION forming part of Letters Patent No. 467,352, dated January 19, 1892.

Application filed June 1, 1891. Serial No. 394,694. (No model.)

*To all whom it may concern:*

Be it known that we, THEODORE H. DEARDORFF and ARLINGTON U. BETTS, of Toledo, county of Lucas, and State of Ohio, have invented certain new and useful Improvements in Pneumatic Seats for Bicycles; and we do hereby declare that the following is a full, clear, and exact description of the invention, which will enable others skilled in the art to which it appertains to make and use the same, reference being had to the accompanying drawings, and to the figures of reference marked thereon, which form part of this specification.

Our invention relates to a pneumatic seat for bicycles, and has for its object to provide a seat supplemental to the bicycle-seat that shall yieldingly support and relieve the body of the rider from the jar and impact due to the contact of the wheel with uneven surfaces upon the street or road bed.

A further object is to construct a pneumatic seat of a contour to register with and be adapted to be secured firmly upon any ordinary bicycle-seat.

A further object is to construct a pneumatic seat for a bicycle in which there shall be formed a central recess having a surrounding yielding cushion, whereby the hips of the rider shall rest upon the yielding side portions of the cushion, thereby protecting the privates, the rear portion protecting the sacrum and coccyx, and the sides affording protection to the thighs.

A further object is to provide a pneumatic seat and means for securing the same to a bicycle-seat.

The invention consists in the parts and combination of parts hereinafter described, and pointed out in the claim.

In the drawings Figure 1 is a perspective view of an ordinary bicycle-seat with a pneumatic seat secured thereon. Fig. 2 is a longitudinal vertical section of the same.

Heretofore a great objection to bicycle-riding has been the discomfort incident to the constant tremor and jar to the seat caused by the uneven surface of the track over which the wheels pass. Another and more serious objection has been the injury to riders due to a contact of the thighs, sacrum, and coccyx with the seat and the danger of a sudden impact of these parts therewith to their injury or to the injury of the privates. Our invention is designed to obviate these objections by protecting these parts of the rider from contact with the seat and entirely precluding the possibility of a sudden and injurious contact therewith should the bicycle-wheel strike an obstruction.

1 designates the frame of the bicycle-seat, it being understood that our invention has reference to all classes of wheels, such as "vertical-fork," "Safeties," or tricycles.

2 designates the bicycle-seat, secured to the frame in the usual manner.

3 designates the pneumatic seat, comprising a tubular body formed of an air-tight flexible covering 4, formed of vulcanized india-rubber, india-rubber cloth, or any flexible air-tight fabric, the body of the seat being in oval form and having a tube 5 at either the point, as shown in full lines, or in the enlarged semicircular rear portion, as shown at 6 in dotted lines, the tube being closed by a screw-plug 7, whereby when the screw-plug is removed the seat may be inflated by exhalation from the lungs, when the screw-plug is inserted and the air confined therein, thereby forming a yielding cushion of the seat with a central recess 8, whereby the hips of the rider shall rest upon a yielding support, thereby relieving the thighs of the pressure heretofore felt in the old form of seat, and relieving the privates from all pressure, while the rear portion of the pneumatic seat protects the sacrum and coccyx.

In order to secure the pneumatic seat to the bicycle-seat, we employ a strap 9 at the rear and having a broad portion 10, which embraces the top of the pneumatic seat, the ends of the strap being slitted, as at 11, to allow the same to straddle the spring 12 of the seat-frame.

The forward end of the pneumatic seat is secured by means of a strap having a portion 13 passed over the top of the same and buckled beneath the saddle, there being a strap 14 at right angles to strap 15, which passes through the slit 16 of the saddle and around the end thereof between the springs, and is drawn sufficiently tight to hold the saddle in place and secure by means of a buckle 17. It will be seen that when the seat is thus secured to the saddle it does not detract from the appearance of the bicycle and that it not only relieves the rider from the disagreeable jar usually felt, but that it obviates prejudices heretofore existing against bicycle-riding in view of injury to the person of the rider.

What we claim is—

The combination, with a bicycle-saddle having a central opening, of a pneumatic saddle-pad arranged upon the saddle and having a central opening also, the forward strap adapted to be passed over the sides of the pad and through the central opening of the same, and the rear strap slitted, as and for the purpose set forth.

In testimony that we claim the foregoing as our own we hereby affix our signatures in presence of two witnesses.

THEODORE H. DEARDORFF.
ARLINGTON U. BETTS.

Witnesses:
WILLIAM WEBSTER,
CARROLL J. WEBSTER.